United States Patent
Kliskey et al.

(10) Patent No.: US 9,162,327 B2
(45) Date of Patent: Oct. 20, 2015

(54) VALVE STEM REPAIR METHOD

(71) Applicants: Roger Kliskey, Akron, OH (US);
Rockford Tyson, Akron, OH (US)

(72) Inventors: Roger Kliskey, Akron, OH (US);
Rockford Tyson, Akron, OH (US)

(73) Assignee: Summit Tool Company, Akron, OH (US)

( * ) Notice: Subject to any disclaimer, the term of this patent is extended or adjusted under 35 U.S.C. 154(b) by 193 days.

(21) Appl. No.: 14/136,606

(22) Filed: Dec. 20, 2013

(65) Prior Publication Data
US 2014/0109982 A1    Apr. 24, 2014

Related U.S. Application Data

(62) Division of application No. 13/236,014, filed on Sep. 19, 2011, now abandoned.

(51) Int. Cl.
*B23P 6/00*    (2006.01)
*B23P 6/04*    (2006.01)
*F16K 15/20*   (2006.01)

(52) U.S. Cl.
CPC ... *B23P 6/00* (2013.01); *B23P 6/04* (2013.01); *F16K 15/20* (2013.01); *Y10T 29/4973* (2015.01); *Y10T 29/49407* (2015.01); *Y10T 29/49723* (2015.01); *Y10T 29/49726* (2015.01); *Y10T 29/53552* (2015.01); *Y10T 137/0491* (2015.04)

(58) Field of Classification Search
CPC ............ B23P 6/04; B23P 6/00; B23P 15/001;
Y10T 29/49726; Y10T 29/49725; Y10T 29/49723; Y10T 29/49732; Y10T 29/4973;
Y10T 29/49744; Y10T 29/49742; Y10T 29/49741; Y10T 29/49739; Y10T 29/49735;
Y10T 29/49734; Y10T 29/49746; Y10T 29/49407; Y10T 29/4941; B23C 3/051;
B23C 3/058; B21D 51/10; B60C 29/005; F16K 15/20
See application file for complete search history.

(56) References Cited

U.S. PATENT DOCUMENTS

| | | | |
|---|---|---|---|
| 917,071 A | 4/1909 | Huestis | |
| 1,170,412 A | 2/1916 | Campbell | |
| 1,469,966 A | 10/1923 | Schweinert | |
| 2,228,984 A | 1/1941 | Broecker | |
| 3,510,929 A | 5/1970 | Kilmarx | |
| 4,670,959 A * | 6/1987 | Rosen | B23P 15/001 29/234 |
| 6,435,788 B2 * | 8/2002 | Reed | 29/402.11 |
| 6,668,784 B1 * | 12/2003 | Sellers | B23B 47/28 123/169 PA |
| 7,168,305 B2 | 1/2007 | Narayanaswamy | |
| 7,764,168 B1 | 7/2010 | Huang | |
| 2003/0215296 A1 * | 11/2003 | Botelle | B23G 9/009 408/72 B |

* cited by examiner

*Primary Examiner* — Jermie Cozart
(74) *Attorney, Agent, or Firm* — Renner Kenner Greive Bobak Taylor & Weber

(57) ABSTRACT

A method for repairing damaged valve stem assemblies includes enlarging a bore within a body of a valve stem to form an enlarged bore portion and creating a conical hole in an end of the valve stem body around the enlarged bore portion. Internal threads are created within the enlarged bore portion, and a valve stem repair extension is installed in the enlarged bore portion. The valve stem repair extension has a beveled surface that mates with the conical hole to form a hermetic seal between the valve stem body and the valve stem repair extension. The steps of enlarging the bore and creating the conical hole may both be performed using a countersinking drill bit having a beveled cutting portion.

7 Claims, 6 Drawing Sheets

VALVE STEM REPAIR METHOD

CROSS REFERENCE TO RELATED APPLICATION

This is a divisional application of application Ser. No. 13/236,014, filed Sep. 19, 2011, now abandoned, the entirety of which is incorporated herein by reference.

FIELD OF THE INVENTION

The present invention generally relates to the art area concerned with pneumatic tires and their maintenance. More particularly, the present invention relates to apparatus and methods for repairing damaged valve stems.

BACKGROUND OF THE INVENTION

Modern pneumatic tires are constructed of a rubber-containing body and tread, and can include an inner tube or can be tubeless. Tires including an inner tube can be found on bicycles, motorcycles, and many large vehicles. Tubeless tires are used in many applications, including nearly all cars and light trucks. For both types of pneumatic tires, a volume of gas is contained within, and provides support to, the other portions of the tire. Pneumatic tires almost universally include a device that allows the tire to be inflated or deflated, thereby providing control over the volume of gas. Typically, this device is a valve stem that contains a valve and provides a point of access that is in fluid communication with the volume of gas and allow gas to be added to or removed from the tire.

Valve caps are used with valve stems and protect the valve components from dirt, water, and other contaminants. Valve caps constructed of plain black plastic are common, but other materials have been used, including metal. However, using a metal valve cap on an aluminum valve stem has proven problematic. The aluminum valve stem reacts with the metal of the valve cap, especially in the presence of humidity, leading to corrosion. It has been observed that when the valve stem and the valve cover are dissimilar metals, the corrosion process may be accelerated. Valve stem damage caused by corrosion can be severe, in some cases leading to the valve stem breaking, especially near the area of the valve stem contacting the valve cap. If a valve stem breaks, it is possible that its air containing functions could be compromised, leading to the rapid deflation of a tire.

Tire pressure monitoring systems (TPMS) have been developed for monitoring the air pressure inside pneumatic tires and can provide real-time pressure information to a driver of a vehicle having such a system. For many designs of TPMS used with tubeless tires, a pressure sensor is connected to, or is integral with, a section of the valve stem within the tire. The combination of a valve stem and a TPMS sensor may be referred to as a TPMS valve stem assembly. The sensor measures the pressure in the tire and communicates the pressure measurement to a receiver, which in turn relays pressure information to an instrument perceivable by a driver. TPMS valve stem assemblies are more susceptible to damage by corrosion than other valve stems that are not associated with a TPMS sensor because they are made of aluminum, rather than brass.

Damaged TPMS valve stem assemblies can require especially costly repairs. For TPMS valve stem assemblies that have become damaged (such as by corrosion), the tire must be disassembled and the entire TPMS valve stem assembly replaced. This is expensive, time-consuming, and inconvenient. Specifically, the tire and wheel assembly must be removed from the vehicle and the tire demounted from the wheel. Then, a new TPMS valve stem assembly is installed and the tire is remounted on the wheel and re-inflated. The tire and wheel assembly is then re-balanced and re-installed on the vehicle. Finally, the new TPMS sensor is programmed to work with the vehicle's system. And because the TPMS sensor is connected to or integral with the valve stem, the entire TPMS valve stem assembly must be replaced, even though the sensor component may be perfectly functional. Alternatively, a replacement valve stem may be installed on a TPMS rather than replacing the entire unit. However, installing a replacement valve stem still requires that the tire be removed from the wheel and the TPMS unit be removed from the wheel. Once a new stem has been installed, the TPMS and tire must be reassembled.

Thus, a need exists for improvements in addressing damaged TPMS valve stems and the costs associated with their replacement.

SUMMARY OF THE INVENTION

In general, a valve stem repair extension according to the present invention includes a generally cylindrical hollow body; a threaded attachment portion on one end of said body for mating with a threaded bore in a damaged valve stem assembly; an outer threaded portion on an end of said body opposite said threaded attachment portion for mating with a valve cap; a valve core threaded into an inner threaded portion of said body; and a beveled surface adjacent to said threaded attachment portion for mating with a conical hole in the threaded bore of the damaged valve stem assembly to create a hermetic seal between the valve stem repair extension and the valve stem assembly.

In accordance with at least one aspect of the present invention, a method of repairing damaged valve stems includes the steps of enlarging a bore within a body of a valve stem to form an enlarged bore portion; creating a conical hole in an end of the valve stem body around said enlarged bore portion; creating internal threads within said enlarged bore portion; and installing a valve stem repair extension in said enlarged bore portion, said valve stem repair extension having a beveled surface that mates with said conical hole to form a hermetic seal between said valve stem body and said valve stem repair extension.

In accordance with at least one aspect of the present invention, a valve stem repair kit includes a valve stem repair extension having a beveled portion adjacent to a threaded attachment portion; and a countersinking drill bit having a beveled cutting surface for forming a conical hole in a damaged valve stem body.

BRIEF DESCRIPTION OF THE DRAWINGS

For a full understanding of the invention reference should be made to the following detailed description and the accompanying drawings, wherein.

DETAILED DESCRIPTION OF THE ILLUSTRATIVE EMBODIMENTS

Figure 1:
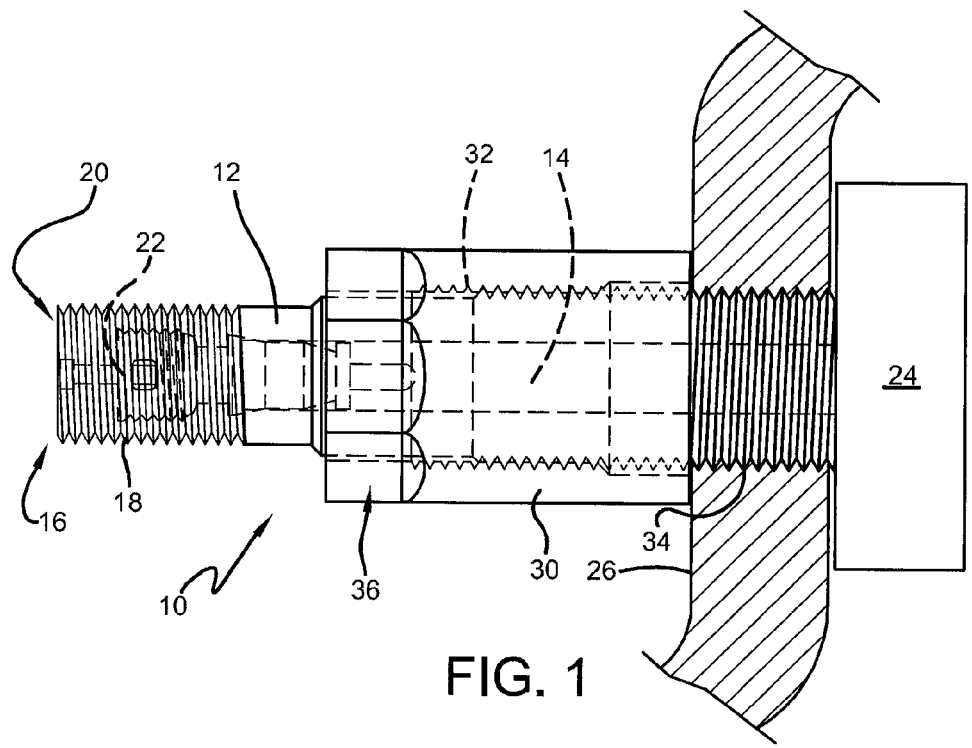
FIG. 1 depicts a valve stem assembly that includes a TPMS sensor installed in a wheel and tire assembly.

Referring now to FIG. 1, a valve stem assembly is shown and is generally indicated by the numeral 10. The valve stem assembly 10 is typical of valve stem assemblies used with modern pneumatic tires and includes a hollow and cylindrical metal body 12 defining a bore 14 extending along the length of the body 12. The features of the valve stem assembly 10 are consistent with the features of valve stem assemblies, generally, which have standardized sizes and dimensions.

At an access end 16 of valve stem assembly 10, an externally threaded (male) portion 18 is provided for mating with an associated valve cap (not shown). An internally threaded (female) portion 20 receives a valve core 22. Valve core 22 is removably threaded into body 12 and generally includes a poppet valve assisted by a spring. In the region near threaded portions 18 and 20, the material thickness of body 12 is the slightest, making the region more susceptible to being damaged or broken than other thicker parts of the valve stem. Access end 16 is where a technician would connect an air supply hose to valve stem assembly 10 to inflate a pneumatic tire associated with the valve stem. Such uses of valve stems are generally known in the art and no further description is necessary to understand the present invention.

At the other end of valve stem assembly 10 is a TPMS sensor 24. FIG. 1 shows valve stem assembly 10 in the context of how it would be situated in a tubeless tire and wheel assembly. Most of body 12 extends from the wheel 26 and the TPMS sensor 24 is positioned on the inside portion of the wheel. In such a position, the TPMS sensor 24 would be inside a tire installed on the wheel and access end 16 would be outside the tire and wheel assembly and accessible to a technician.

A mounting nut 30 may be used as part of valve stem assembly 10 to form a tightened connection between the valve stem assembly and an associated wheel. Mounting nut 30 includes an internal threaded (female) portion 32 for mating with an external threaded portion 34 of body 12. Mounting nut 30 is useful for the installation of valve stem assembly 10 onto a wheel of a tubeless tire and wheel assembly, with mounting nut 30 being rotated to tighten the connection between the valve stem and the wheel. Mounting nut 30 can define a hexagonal portion 36 resembling the head of a bolt to allow for the easy manipulation of the mounting nut with a hand tool, such as a socket wrench. While a mounting nut is not crucial to features of the present invention, they are encountered in the valve stem arts.

Figure 2:
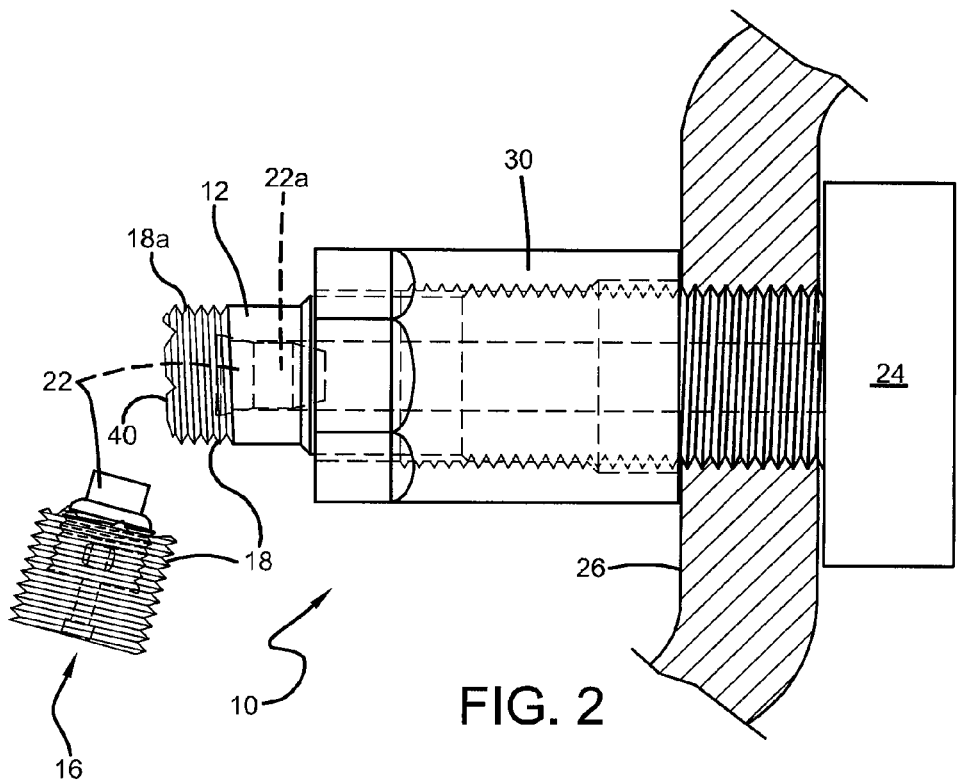
FIG. 2 depicts the valve stem of FIG. 1 installed in a wheel and tire assembly, but in a damaged state.

Turning to FIG. 2, valve stem assembly 10 is shown in a damaged state. In particular, part of body 12 and valve core 22 have broken off near access end 16, so that only a portion 18a of the original externally threaded portion 18 remains on the valve stem assembly 10. Also, the valve core 22 is broken so that only a portion 22a remains in the body 12. The broken body 12 creates a jagged broken edge 40. Repairing the damaged valve stem assembly 10 would be preferable to replacing it, and the apparatus and methods for doing so will now be described.

Figure 3:
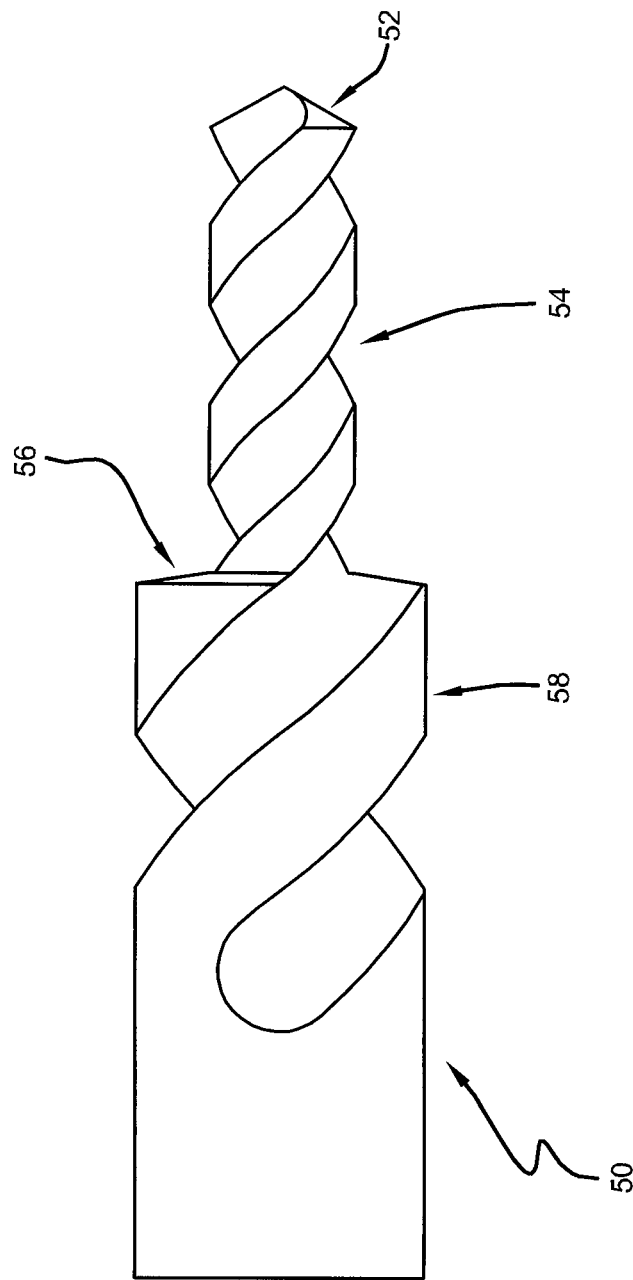
FIG. 3 depicts a countersinking drill bit used for repairing a damaged valve stem.

A countersinking drill bit is used to prepare a damaged valve stem for repair and is generally indicated by the numeral 50 in FIG. 3. Countersinking drill bit 50 is a twist drill bit and includes a cutting tip 52, a first fluted portion 54, a beveled cutting portion 56, and a second fluted portion 58. Cutting tip 52 is useful for drilling cylindrical holes in an object. Beveled cutting portion 56 cuts a conical hole in an object. Fluted portions 54 and 58 serve to move chips away from the cutting portions 52 and 56, respectively. The use of drill bits, such as countersinking drill bit 50, and their associated drills will be appreciated by a skilled technician. The size characteristics of countersinking drill bit 50 are chosen to create holes that work with a valve stem repair extension, which will be described more fully below.

Before countersinking drill bit 50 is used on the damaged valve stem assembly 10, the remaining portion 22a, if any, of the valve core 22 must be removed from the valve stem. Valve core tools are useful for installing, removing, and maintaining valve cores and are commercially available. An example of a suitable valve core tool for removing the portion 22a is the Ken-Tool 30215 4-Way Valve Core Tool, sold by Summit Tool Company of Akron, Ohio. All of portion 22a of valve core 22 must be removed from valve stem assembly 10, including any bits of the valve core body or valve core seal which may have remained in the valve stem. The removed portions will not be re-used and can be discarded. Once the valve core 22 is completely removed from the valve stem assembly 10, the valve stem should be empty and the technician should assure that there is nothing in the bore 14.

Once the valve core 22 has been completely removed, countersinking drill bit 50 is used on the damaged valve stem assembly 10 as follows. With reference to the features shown FIG. 2, the cutting tip 52 is placed into the bore 14 of the valve stem assembly 10 near jagged broken edge 40 so that the drill bit is essentially concentric with the bore. Countersinking drill bit 50 is activated, providing torque on the drill bit, which begins cutting into the body 12 of valve stem assembly 10. Countersinking drill bit 50 is advanced in bore 14 in a direction parallel with the bore, and the first cutting portion 52 cuts a cylindrical hole in body 12, essentially increasing the diameter of the bore to create an enlarged bore portion. Countersinking drill bit 50 is advanced further, and the second cutting portion 56 completely cuts away the body 12 in the area of the outer threaded portion 18a. Countersinking drill bit 50 is advanced until the outer threaded portion 18 is completely removed from the body 12 and the beveled cutting portion 56 cuts a conical hole in a portion of the body below where the outer threaded portion 18 had previously been. The countersinking drill bit 50 is then withdrawn from the valve stem assembly 10.

The axial length of first cutting portion 54 is chosen so that when the beveled cutting portion 56 cuts its conical hole, the enlarged bore portion extends sufficiently far into body 12 in order for a valve stem repair extension to be completely received therein. The valve stem repair extension will be described, along with its relationship to the valve stem 10, below.

A tap is then used to create threads in the enlarged bore portion of the body 12 drilled out by the countersinking drill bit 50. A suitable tap will create threads corresponding with the threads on a valve stem repair extension. Taps are generally available in the market and examples of suitable taps are those having a T-shaped handle, which provide a convenient wrenching surface for a technician to use when tapping the threads.

Figure 4:
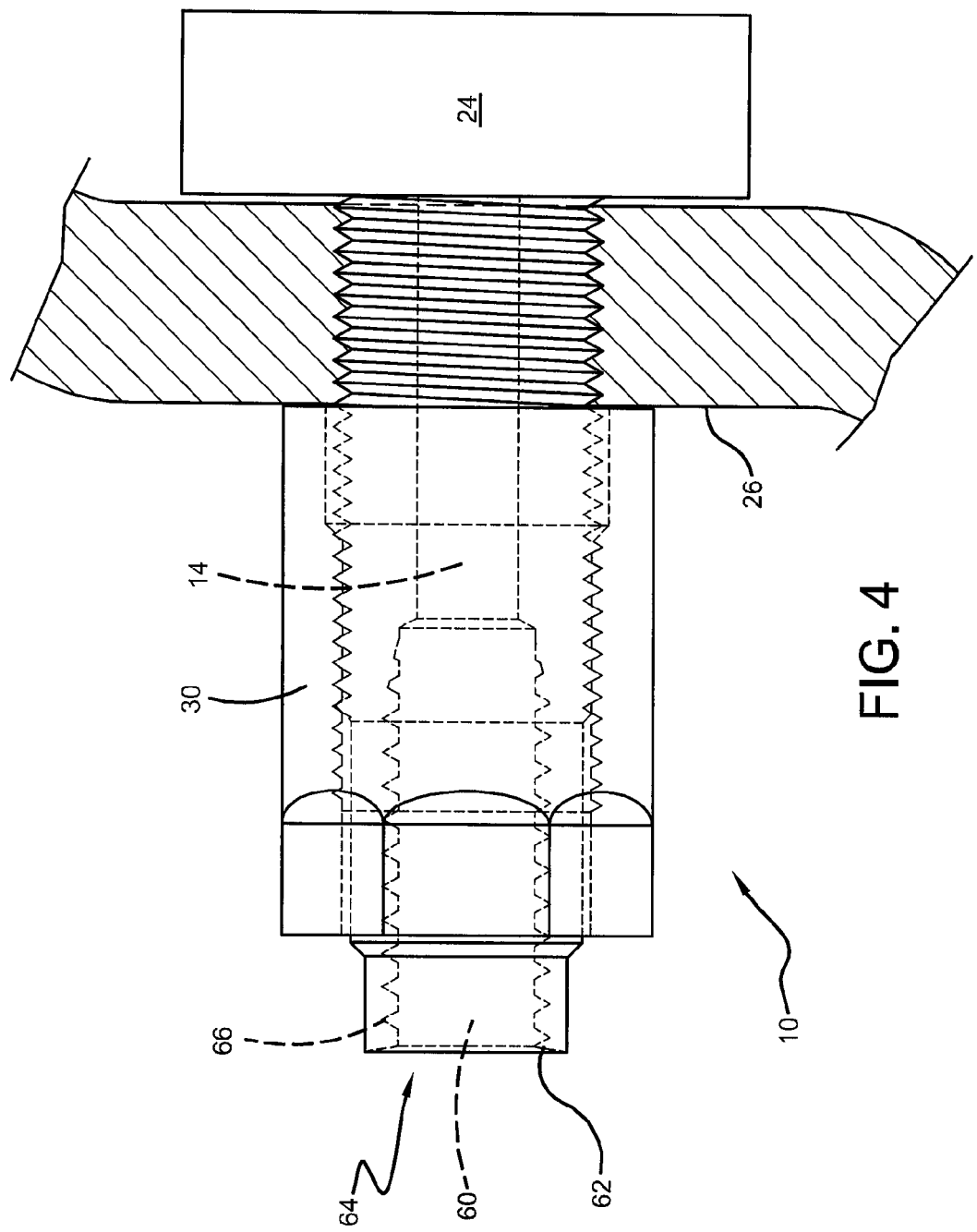
FIG. 4 depicts the valve stem of FIG. 2 after drilling, countersinking, and tapping steps have been performed to prepare it to receive a valve stem repair extension.

Turning to FIG. 4, a valve stem assembly 10 is shown after it has been drilled and tapped. It includes an enlarged bore portion 60 in body 12 created by the first cutting portion 54 of the countersinking drill bit 50 during the drilling step. It also includes a beveled surface 62 created by the beveled cutting surface 56 during the drilling step. Beveled surface 62 defines a conical hole 64 in body 12 that leads into the enlarged bore portion 60. Internal threading (female) 66 is included in enlarged bore portion 60 and was created during the tapping step.

Figure 5:
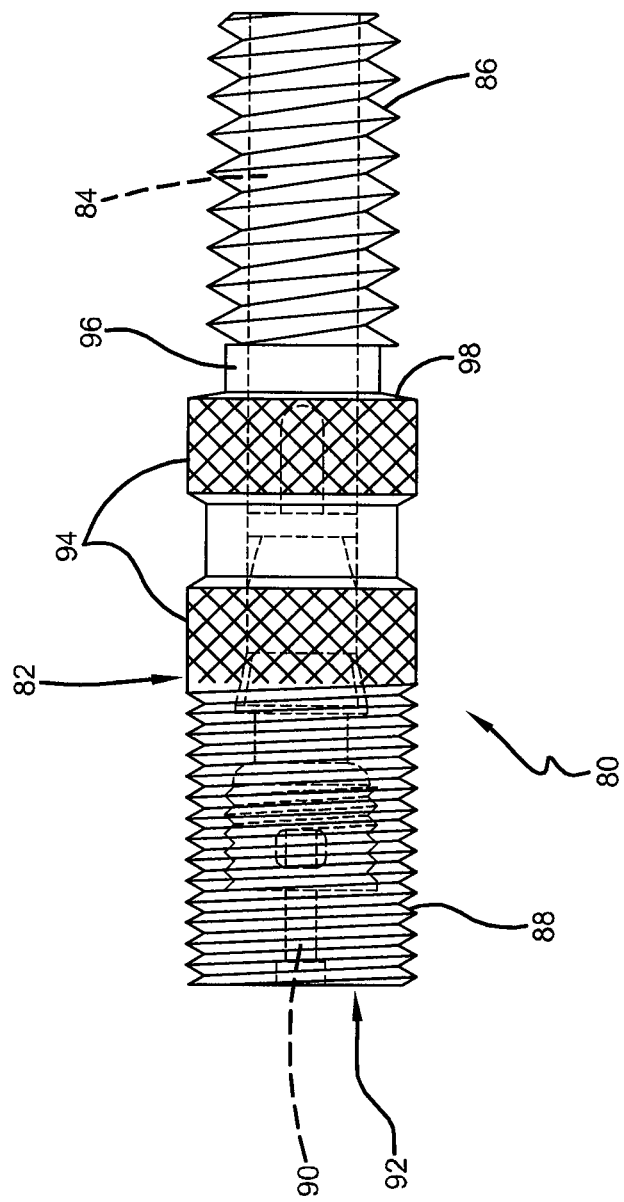
FIG. 5 depicts a valve stem repair extension.

A valve stem repair extension is shown in FIG. 5 and is generally indicated by the numeral 80. Valve stem repair extension 80 includes a hollow and generally cylindrical body 82 that defines a bore 84 extending along the length of the body. Body 82 includes at one end a threaded attachment portion 86 that is designed to mate with the enlarged bore portion 60 of the valve stem assembly 10. At the other end, an outer threaded (male) portion 88 is provided for mating with a valve cap (not shown). A valve core 90 is threaded into an inner threaded (female) portion 92 of body 82. Knurled portions 94 may be provided to improve the tactile handling of the valve stem repair extension as it is twisted so as to thread into the body of a valve stem assembly. Body 82 can include a cylindrical shank 96 between a knurled portion 94 and the threaded attachment portion 86. Body 82 includes a beveled surface 98 that is designed to fit within the conical hole 64 created in the body 12 of the valve stem assembly 10 during the drilling step, thereby creating a tight and sealed connection between the valve stem repair extension 80 and the valve stem assembly 10.

Valve stem repair extension 80 is installed into the valve stem assembly 10 (as shown in FIG. 4, after the drilling and tapping steps) as follows. Threaded attachment portion 86 is inserted and threaded into the internal threading 66 of enlarged bore portion 60. Thread sealant (not shown) may optionally be applied to the threaded attachment portion 86 before it is threaded into the enlarged bore portion 60 to encourage an improved seal between the two pieces. The valve stem repair extension 80 is threaded into the valve stem assembly 10 until the beveled surface 98 (of the valve stem repair extension) snugly engages the beveled surface 62 (of the valve stem assembly). The corresponding shapes of the two pieces allow a tight seal to be created when the conical shape of the valve stem repair extension is pushed into the conical hole of the valve stem assembly. Achieving a tight seal is important to prevent air from escaping through the repaired valve stem assembly.

Figure 6:
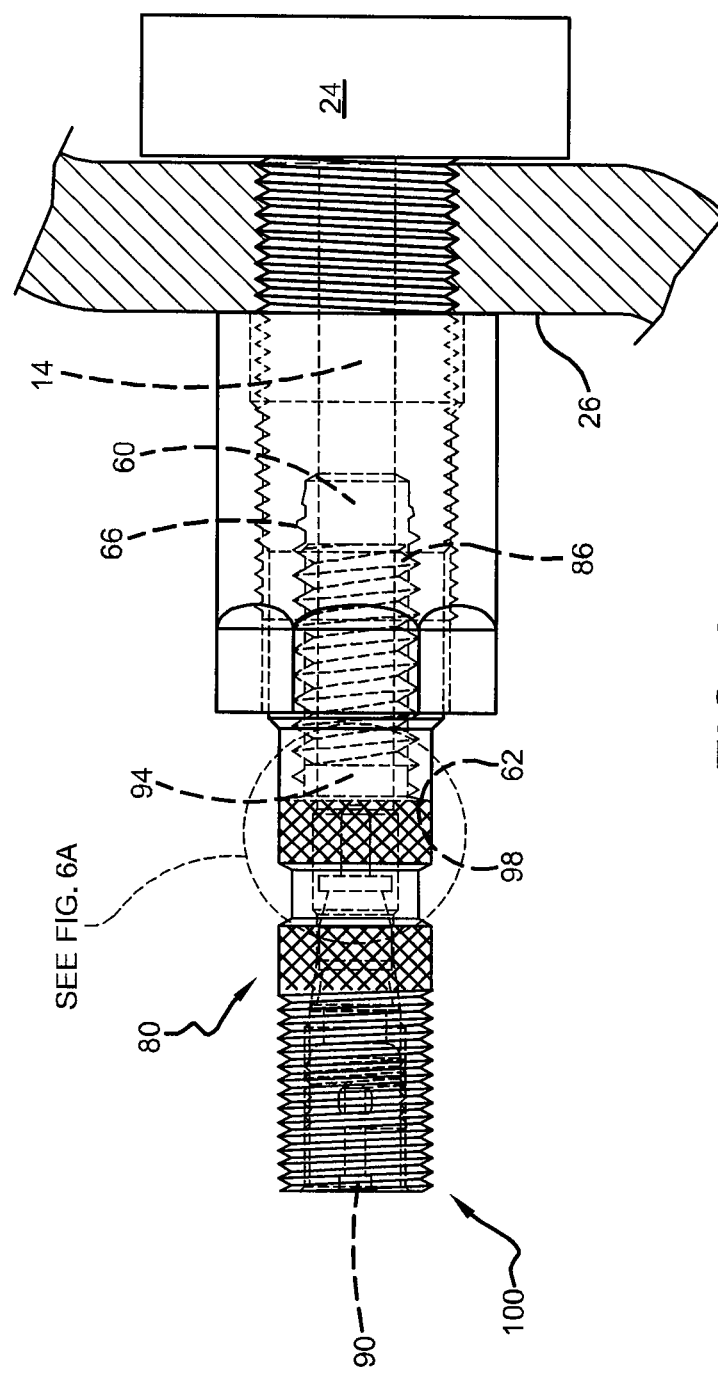
FIG. 6 depicts the valve stem repair extension of FIG. 5 installed into the valve stem of FIG. 4.
Figure 6A:
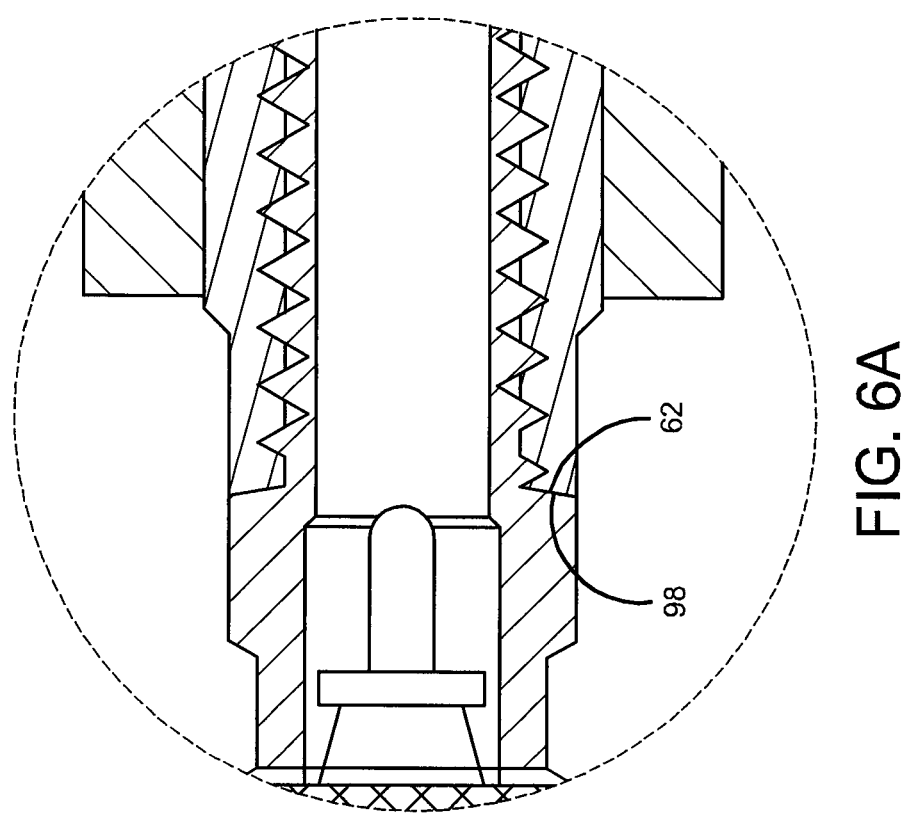
FIG. 6A is an enlarged view of a portion of FIG. 6 showing mating beveled surfaces of a valve stem repair extension and a body of a valve stem assembly.

A repaired valve stem assembly is shown in FIG. 6. The valve stem repair extension 80 has been threaded into the body 12 of the valve stem assembly 10 to the point where the beveled surfaces 98, 62 contact and make a tight seal between the two pieces. As shown, the enlarged bore portion 60 extends sufficiently far into body 12 to accommodate the complete insertion of the valve stem repair extension 80. Once the valve stem assembly 10 has been thus repaired, bore 14, enlarged bore portion 60 (both in the valve stem assembly 10) and bore 94 (in the valve stem repair extension 80) are all in fluid communication, and the valve stem repair extension 80 can be used to facilitate the inflation or deflation of an associate tire, with a new access point 100 being created near the valve core 90.

The steps for repairing a damaged valve stem assembly can be summarized as follows. First, any remaining portion of a damaged valve core, including the valve core body and valve core seal, is removed from the valve stem of the valve stem assembly. Once the valve core has been removed, a countersinking drill bit is used to enlarge the size of the bore within the valve stem, to remove the broken outer threaded portion of the valve stem, and to create a beveled surface defining a conical hole in the valve stem body. A tap is then used to create threads in the enlarged bore portion of the body of the valve stem, the threads created by the tap being adapted to engage and receive a valve stem repair extension. A valve stem repair extension is then installed in the enlarged bore, the valve stem repair extension having a beveled surface on one end of its body that mates with the conical hole in the valve stem body to create a hermetic seal. In this way a damaged valve stem assembly can be repaired without the expense and hassle associated with replacing the assembly.

A kit including components for repairing a damaged TPMS valve stem assembly can be provided and can comprise any or all of the components discussed above, including: (1) a valve stem repair extension, (2) a core tool for removing the old valve core from the damaged valve stem assembly, (3) a countersinking drill bit for drilling out the damaged valve stem assembly, (4) a tap for creating threads in the drilled-out valve stem assembly, and (5) thread sealant.

It is thus evident that apparatus and method for repairing damaged valve steps constructed and performed as described herein substantially improves the art. In accordance with the Patent Statutes, only the best mode and preferred embodiment have been presented and described in detail. The invention should not be limited by the drawings or the description provided herein. For an appreciation of the true scope and breadth of the invention, reference should be made only to the following claims.

The invention claimed is:

1. A method of repairing damaged valve stems comprising:
   a. enlarging a bore within a body of a valve stem to form an enlarged bore portion;
   b. creating a conical hole in an end of the valve stem body around said enlarged bore portion;
   c. creating internal threads within said enlarged bore portion; and
   d. installing a valve stem repair extension in said enlarged bore portion, said valve stem repair extension having a beveled surface that mates with said conical hole to form a hermetic seal between said valve stem body and said valve stem repair extension.

2. The method of claim 1, further comprising the step of removing any remaining portion of a damaged valve core from the valve stem prior to enlarging the bore to form an enlarged bore.

3. The method of claim 1, wherein the steps of enlarging the bore and creating the conical hole are both performed using a countersinking drill bit having a beveled cutting portion.

4. The method of claim 1, wherein the steps of enlarging the bore and creating the conical hole are both performed using a countersinking drill bit having a first cutting portion for forming the enlarged bore portion, and a second beveled cutting portion for removing a broken threaded portion of the body of the valve stem, and forming the conical hole.

5. The method of claim 1, wherein the step of creating the internal threads is performed using a tap.

6. The method of claim 1, wherein the step of installing a valve stem repair extension includes installing a valve stem repair extension having a body with a bore disposed therein, a threaded attachment portion at one end of the body adapted to mate with the enlarged bore portion of the valve stem, and a valve core within the bore.

7. The method of claim 6, further comprising the step of applying a thread sealant to the threaded attachment portion prior to the step of installing the valve stem repair extension.

* * * * *